No. 869,216.

PATENTED OCT. 22, 1907.

A. MITTELSTEN SCHEID.
JACQUARD CARD PUNCHING MACHINE.
APPLICATION FILED AUG. 25, 1906.

7 SHEETS—SHEET 1.

No. 869,216. PATENTED OCT. 22, 1907.
A. MITTELSTEN SCHEID.
JACQUARD CARD PUNCHING MACHINE.
APPLICATION FILED AUG. 25, 1906.

7 SHEETS—SHEET 2

Witnesses:

Inventor,
August Mittelsten Scheid
by
Dickerson Brown Raegener + Binney
attys

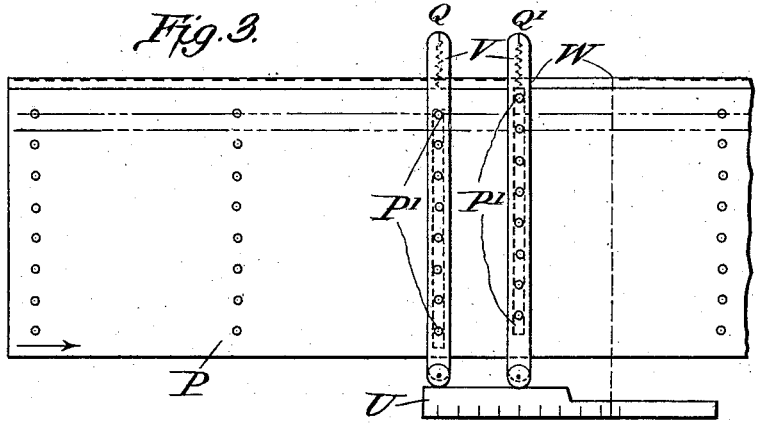
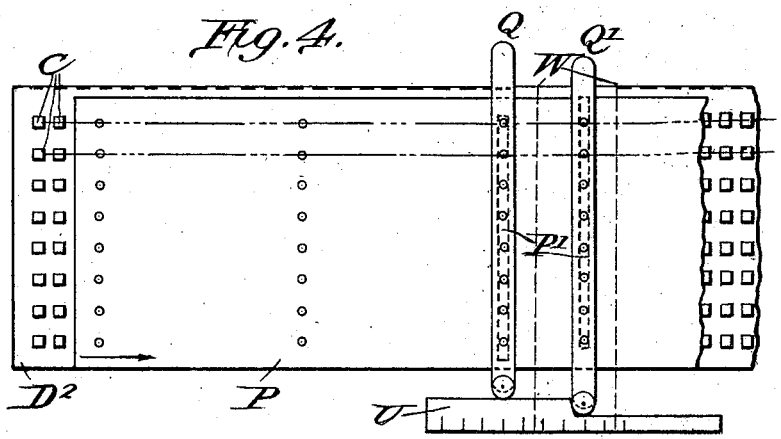
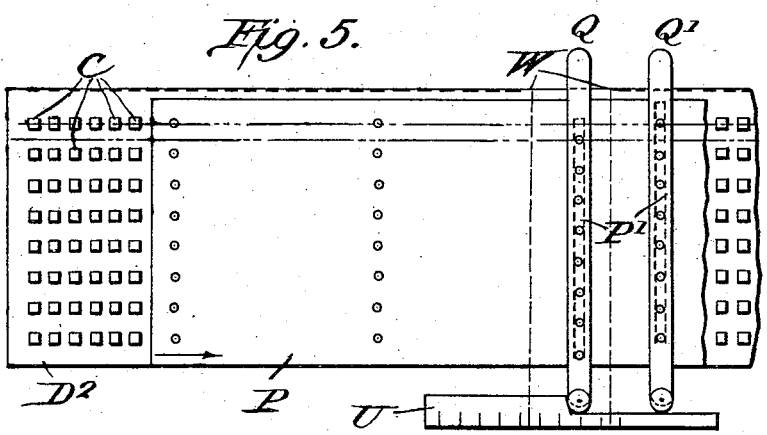

No. 869,216.

PATENTED OCT. 22, 1907.

A. MITTELSTEN SCHEID.
JACQUARD CARD PUNCHING MACHINE.
APPLICATION FILED AUG. 25, 1906.

7 SHEETS—SHEET 4.

Witnesses:

Inventor,
August Mittelsten Scheid
by
Dickerson Brown Raegener & Binne
Attys

No. 869,216. PATENTED OCT. 22, 1907.
A. MITTELSTEN SCHEID.
JACQUARD CARD PUNCHING MACHINE.
APPLICATION FILED AUG. 25, 1906.
7 SHEETS—SHEET 5.
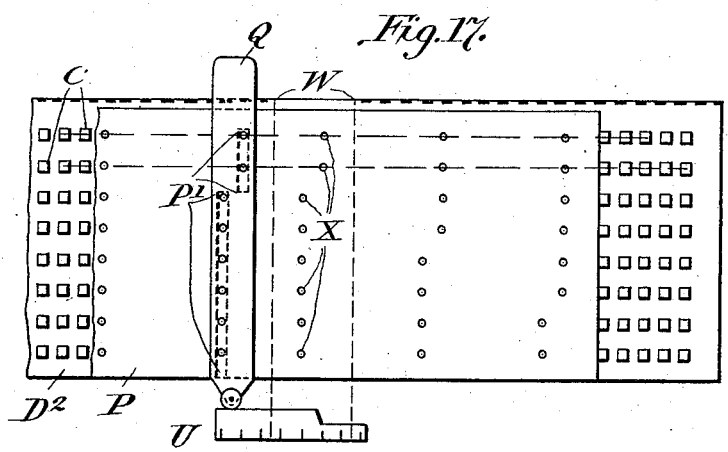
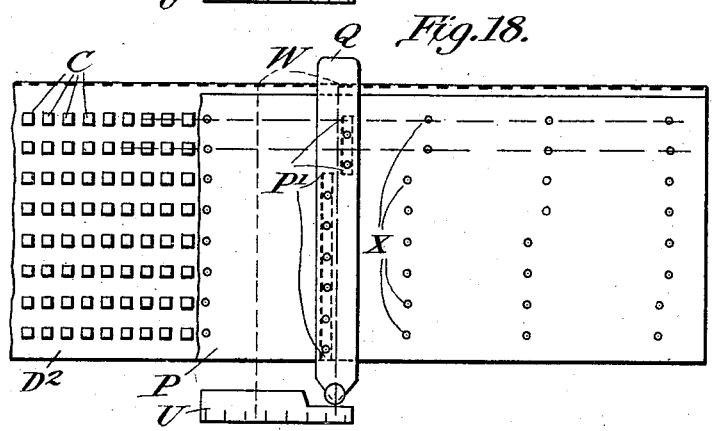
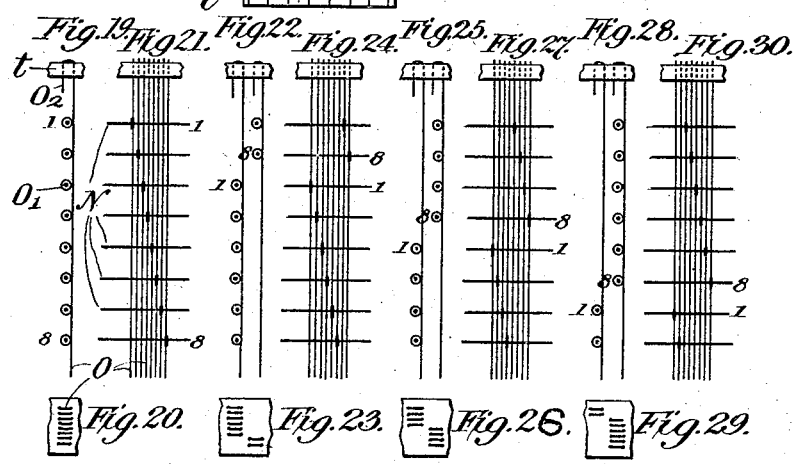
Witnesses:
Inventor,
August Mittelsten Scheid
by
Dickerson Brown Raegener & Binney
Attys No. 869,216.   PATENTED OCT. 22, 1907.
A. MITTELSTEN SCHEID.
JACQUARD CARD PUNCHING MACHINE.
APPLICATION FILED AUG. 25, 1906.

7 SHEETS—SHEET 6.

Witnesses:

Inventor,
August Mittelsten Scheid
by
Dickerson Brown Raegener & Binney
Attys

THE NORRIS PETERS CO., WASHINGTON, D. C.

No. 869,216. PATENTED OCT. 22, 1907.
A. MITTELSTEN SCHEID.
JACQUARD CARD PUNCHING MACHINE.
APPLICATION FILED AUG. 25, 1906.

7 SHEETS—SHEET 7.

Attest:

Inventor:
August Mittelsten Scheid
by Dickerson, Brown,
Raegener + Binney Attys.

UNITED STATES PATENT OFFICE.

AUGUST MITTELSTEN SCHEID, OF BARMEN, GERMANY.

JACQUARD CARD-PUNCHING MACHINE.

No. 869,216.　　　　Specification of Letters Patent.　　　　Patented Oct. 22, 1907.

Application filed August 25, 1906. Serial No. 332,000½.

*To all whom it may concern:*

Be it known that I, AUGUST MITTELSTEN SCHEID, a subject of the German Empire, residing at Barmen, in the Rhine Province, Prussia, Germany, have invented certain new and useful Improvements in Jacquard Card-Punching Machines, of which the following is a specification accompanied by drawings.

This invention relates to a jacquard card punching machine especially for such patterns that are to appear more than one time side by side in the cards and it has for its object to provide a reading-in or punch selecting apparatus enabling the required number of pattern-repeats to be automatically produced at one and the same time, that is to say, by and during a single reading-in of the pattern.

Further objects of the invention will hereinafter appear and to these ends the invention consists of apparatus for carrying-out the above object, embodying the features of construction, combinations of elements, and arrangement of parts, having the general mode of operation substantially as hereinafter fully described and claimed and as illustrated in the accompanying drawings which show sufficient parts of the machine and sufficient examples of the mode of using it to enable the application of my invention to be clearly understood, and in which—

Figure 1:
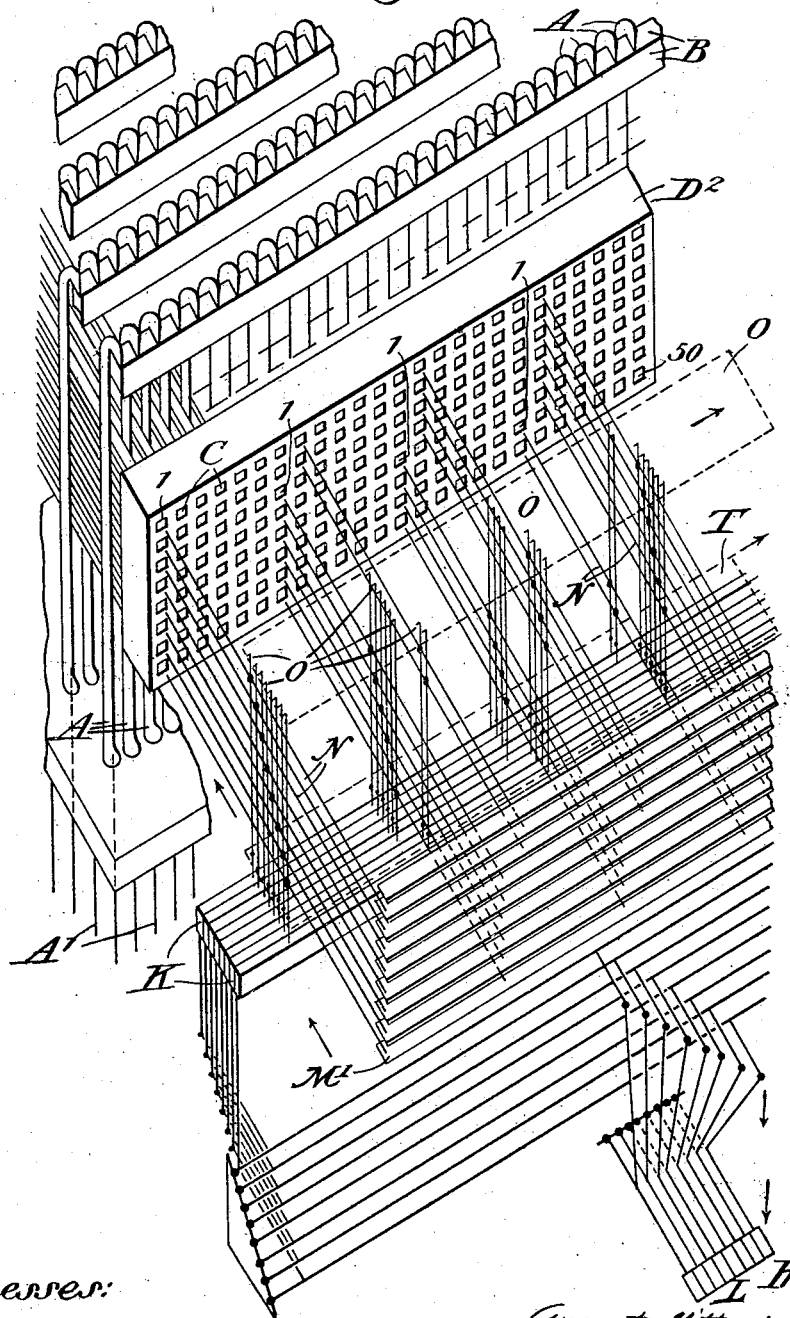
Figure 2:
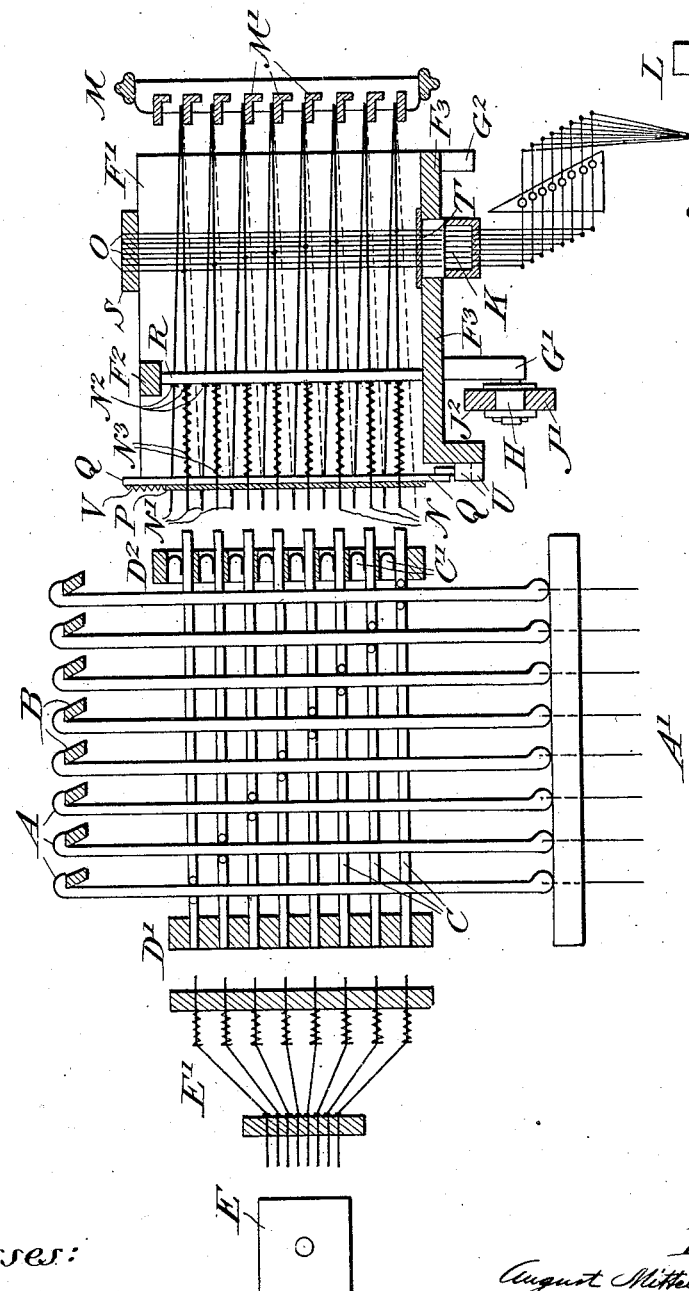
Figure 6:
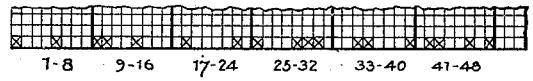
Figure 7:
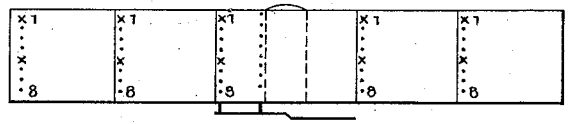
Figure 8:
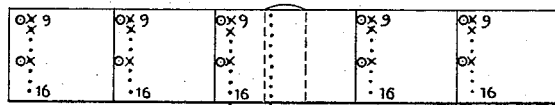
Figure 9:
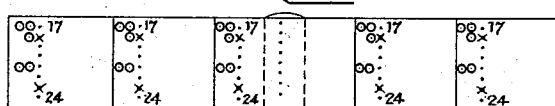
Figure 10:
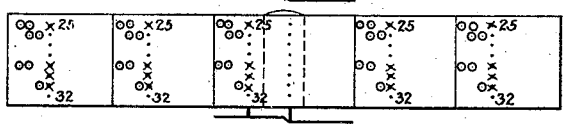
Figure 11:
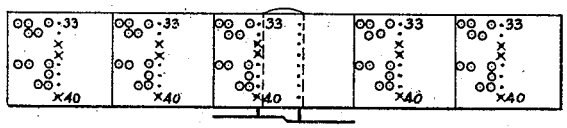
Figure 12:
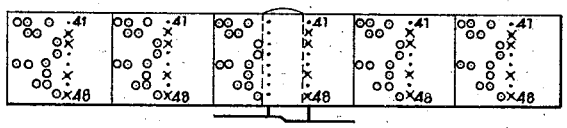
Figure 13:
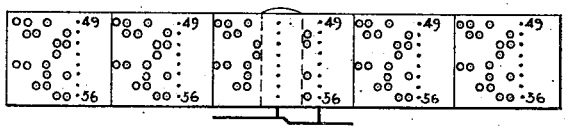
Figure 14:
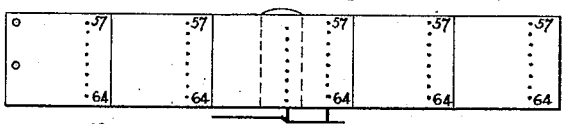
Figure 15:
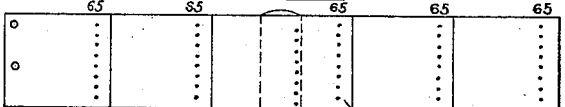
Figure 16:
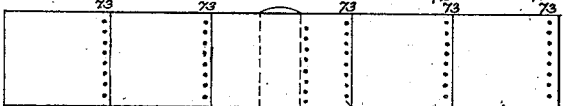
Figure 31:
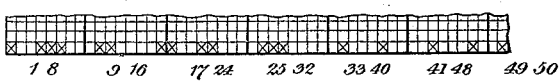
Figure 32:
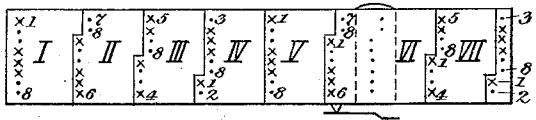
Figure 33:
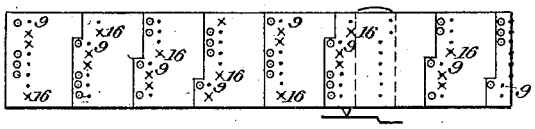
Figure 34:
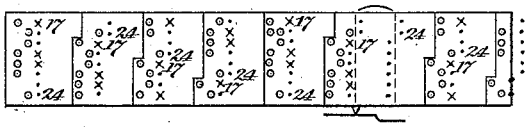
Figure 35:
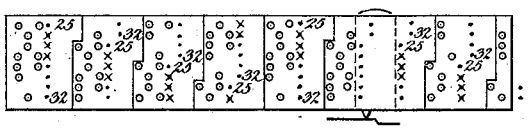
Figure 36:
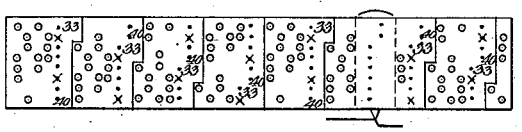
Figure 37:
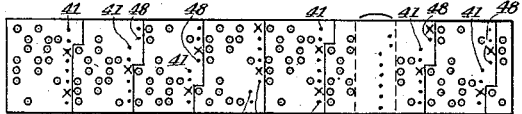
Figure 38:
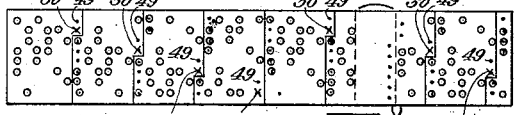
Figure 39:
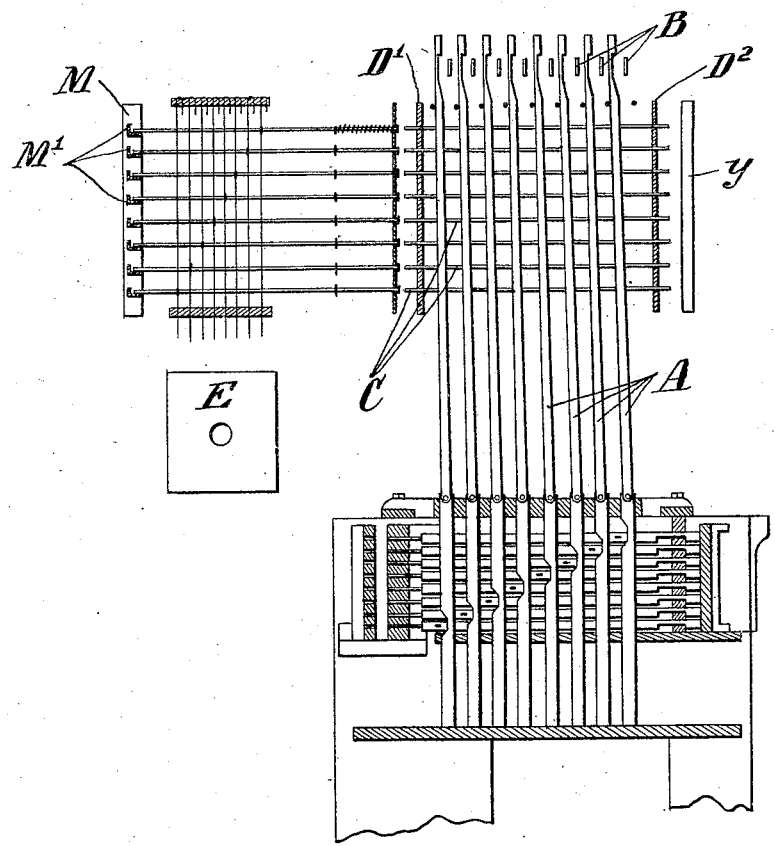

Figures 1 and 2 are respectively parallel-perspective and side views, showing diagrammatically and partially sectionally the essential elements of a machine according to the present invention; Figs. 3, 4 & 5 are top views, showing fragmentarily the guiding plate and slide-strips for that disposition of the pushing-needles which is necessary for producing cards according to Figs. 6 to 16 and the jacquard needles behind that plate. Fig. 6 shows a fragment of one card line of a designed pattern. Figs. 7 to 16 are top views, showing diagrammatically the proceeding of producing at one time five repeats of the design line Fig. 6, all of the repeats beginning on the first long-row of holes in the card. Figs. 17 & 18 are top views, showing fragmentarily the guiding plate & slide-strips for that disposition of the pushing needles which is necessary to produce the cards according to Figs. 31 to 38, and the jacquard needles behind that plate. Figs. 19 to 30 are front, top and side views showing the connections of the pushing needles with the feeler needles for the cards according to Figs. 31 to 38. Fig. 31 shows one card line of a designed pattern. Figs. 32 to 38 are top views showing diagrammatically the proceeding of producing at one time seven complete repeats and a fragmentary repeat of the design-line Fig. 31, the repeats beginning not all on the same longitudinal row of holes in the card. Fig. 39 is a side view and partial section showing the lifting hooks directly connected with the abutment keys of a punching apparatus, and combined with copying or punching means, the selecting apparatus for selecting the different punches not being shown.

Hitherto it has been necessary either to read-in the pattern as many times as repeats were required to appear side by side in the card, or to read-in at the same time a corresponding plurality of "simple"- or "drawing"-cords. The former of these modes, of course, is very tedious if there are many repeats or if the pattern is large, and the latter methods require extremely long simples, that cannot be read-in quite easily and quickly and which it is difficult to transfer and connect to the punches and which besides do not work satisfactorily. Now, in order to obviate these drawbacks, I entirely dispense with said simple- and drawing-cords and with the simple-frames, and use controlling-means, such as pushing- and feeler needles, or such as pegs or blanks in perforated plates that can be disposed in a carriage or sledge opposite to and movable across the punches or punch-abutment-keys or the needles of an intermediate jacquard-mechanism, both in conformity with the order or positions of the punches, keys or needles and at the same time according to a set of successively arranged key-governed bars or levers so that all controlling-means of corresponding ordinal numbers, in the required repeats can be actuated at one and the same time; I do not require a full number of said controlling-means but only so many for each repeat as there are punches for one transverse-row of the card, and I effect the selecting of the other punches, or abutment-keys, or jacquard-needles, by shifting this partial number of controlling-means by means of said carriage or sledge as the reading-in of the pattern-line proceeds. I further duplicate the punches, or punch-abutment keys, or the needles of an intermediate jacquard mechanism, as many times as there are repeats to be punched simultaneously, and I duplicate the controlling means to the same extent, the mechanism being such that each finger key controls a corresponding punch-controlling-device of each of the duplicate sets of controlling means corresponding to the repeat to be punched.

In the construction illustrated by Figs. 1 & 2, the selecting-apparatus is not directly combined with the punch-apparatus, but by the medium of a jacquard-like mechanism having hooks A, lifting-knives B and needles C. The hooks A carry the punches or the punch-abutment-keys, either directly, being pivoted thereto, Fig. 39, or by means of cords $A^1$. The slip-needles C are suitably four-edged and guided at their ends by grates $D^1$, $D^2$; in one of these ($D^2$, Fig. 2) springs $C^1$ are pressing against the needles to secure them against slipping and hold them stationary also in the rearward position after the actuation, until returned to their front-positions. The slight friction of the needles in the apertures of gratings D when said needles are placed horizontally or nearly so, as illustrated in Fig. 2, in itself tends to hold said needles stationary and will often be sufficient for that purpose, without the springs $C^1$. The return of the needles may be done by means of a reciprocating plate behind the grate $D^1$ (Fig. 2) or by a card-prism E provided to operate against the needles $E^1$ for enabling cards to be copied. Of course, the copying-device might also consist of a fore-needle-device as known in the "Verdol"-mechanisms, and as shown in Fig. 39.

The carriage or sledge is arranged opposite to the grate $D^2$ (Figs. 1 & 2) and consists of the boxing or framing $F^1$ to $F^4$. The bottom plate $F^3$ is provided with supports $G^1$, $G^2$, that carry rollers such as H sliding between rails $J^1$, $J^2$. The upper rails may be removable to enable the carriage to be detached. The movement of the carriage or sledge, each time a distance equal to that of one vertical row of needles C to the next, may be effected by any such device as is used for paper-carriages of type-writing-machines.

Extending below and along the bottom plate $F^3$ are, supported at the side-stands on which the carriage is disposed, a set of so many bars K (Figs. 1 & 2) as there are needles C in each vertical row, the bars being in regular order connected by rods and levers with keys L, so that if the first key is struck the first of the bars will be raised, and so on, these bars K extend transversely across the machine beneath the duplicate sets of controlling devices before referred to, and each serves when operated by the corresponding key L, to effect the operation of the corresponding punch-controlling needle C of each of the duplicate sets of such needles. This is illustrated diagrammatically in Fig. 1.

In front of the carriage is provided a pushing-grate M with angle bars $M^1$ which are movable by suitable means actuated by a pedal or the like.

The needles C are controlled from bars K by means of pushing needles N, each governed by a corresponding feeler needle O. There are as many of these needles N (and as many corresponding feeler needles O) in each set, as there are needles C in a vertical row.

The ends of the pushing-needles turned toward the needles C pass normally horizontally through holes of an exchangeable guide-plate P, while the other ends rest on the backs of the angle-bars $M^1$ of the pushing-grate. Certain, $N^1$, of the pushing-needles are, however passed (for purposes hereinafter mentioned) somewhat obliquely or are enabled to be deviated so as to pass obliquely, by means of slide-strips Q, in such manner that their points are out of acting-direction, that is to say, cannot hit the corresponding needles C and will therefore remain without effect when pushed toward these. For securing their longitudinal position and effecting their return-movement, the pushing-needles are provided with stops or collars $N^2$ and with spiral springs $N^3$ between the plate P and the stops that are pressed thereby against the guide-reeds R.

The feeler-needles O, shown particularly in Figs. 19 to 29, have eyes $O^1$ for carrying the pushing-needles and are guided by means of hooks $O^2$ in the top plate or grate S, while their lower ends pass through a hole plate T above said bars K by means of which the feeler-needles can be lifted, thereby bringing their pushing-needles into the range of action of the angle-bars $M^1$ of the pushing-grate and consequently into action against the needles C. The punches are supposed for Figs. 1 & 2 to cut if they are not lifted by the hooks A, that is to say, if the pushing-needles N act upon the needles C disengaging thereby the hooks from the knives B. If the reversed action is required the angle-bars $M^1$ are turned upward. This is shown in Fig. 39.

It is of course preferable to operate the knives B and the punching-apparatus (by means of a motor actuated by a pedal) only after all needles C required for a card are controlled.

For thin cards, it is preferable to omit the Jacquard-apparatus and control the punches directly by the pushing-needles, and in this case the pushing-grate M is adapted to operate the pushing-needles so that they not only select the punches but at the same time press the selected punches through the paper.

When using the copying apparatus, Figs. 2 and 39, the carriage of the selecting apparatus is removed and a reciprocating plate Y, Fig. 39, is supplied for pushing back the needles C after each actuation.

The disposition of the pushing and feeler-needles is made in conformity with the places of those needles C on which the commencement of a repeat is to fall. If, for example, a repeat is beginning with a full vertical row of needles C, the set of controlling-needles are disposed, as shown in Fig. 2 and in the first set of Fig. 1, so that in the starting position of the carriage the pushing needles are exactly opposite to the eight needles C of the first vertical row, and the feeler-needles are in regular order over the bars K. Consequently, Nrs. 1 to 8 of the needles C can be selected by the first position of the carriage; by shifting-on the carriage, however, Nrs. 9 to 16 of the needles C can be selected, and so on, so that for any pattern comprising say 400 needles 50 positions of the carriage will be necessary for each card. If two repeats of said width are required in the cards, a second but equal set of pushing-needles would be disposed at a distance from the first equal to the distance between the first vertical row of needles C and the 51st. As both sets of the pushing- and feeler-needles are actuated by the bars K in automatical conformity, the latter cards will be produced with the same number of positions of the carriage as the former.

It frequently happens that a repeat is to be offset laterally on the woven strip with reference to the preceding repeat, and this necessitates a corresponding offsetting of the hole punched in the cards. For this reason the corresponding finger C of the two adjacent repeat-series, may not be in corresponding vertical rows. For example, comparing Figs. 1 and 31—38 inclusive, the design of Fig. 31 being one in which corresponding portions of different repeats are relatively offset, it will be observed that the holes punched in the second card corresponds in each instance to holes two spaces above in the first card, and so on through the card. In such case, whereas all of the needles C of one repeat-group may be in a single vertical row, the needles of other repeat-groups may be in different rows; and this is the case in the arrangement shown in Fig. 1.

In cases, Fig. 1, of the repeats beginning not or not all with full vertical rows of needles C, the sets of pushing- and feeler-needles will form accordingly broken lines, the section of the first row being completed by the section of the second row. Besides, in the latter cases, there will remain for the last position of the carriage less needles C to be selected than there are for the other positions. But again the feeler needles for the first pushing-needles are disposed above the bar K Nr. 1, and so on and thus the principle and the effect are the same as if the repeats are commencing all with full rows. Figs. 1 and 19 to 30 show the disposition of 4 sets of pushing- and feeler-needles for 4 repeats in the card of any pattern comprising 50 needles C. The first set is a single row set, while the others are broken sets. After the seventh position of the carriage, for which, however, only two needles C in each repeat remain to be selected, a card will be ready to be punched.

In case of a repeat to be crossed in the cards by the interspace for lacing and the guide-pegs, it is necessary to enable the pattern to be skipped over so that the second section of such repeat is the correct continuation and full completion of the first section. To accomplish this, I provide a second but equal set of pushing- and feeling-needles at such a distance from the first that the second set will begin controlling the second section as soon as the first set have left the first section. Obviously this distance will therefore comprise one transverse row of needles C less than are omitted or made ineffective for the interspace. Consequently the only cases in which the two sets would not come to interfere in action would be those cases in which both sections comprise only as many rows of needles C as, or less rows than, the interspace. In the cases in which only one of the sections comprises more rows than the interspace, the set for the smaller section will in the course of operation of the carriage come to enter the larger section, and in the cases of both sections comprising more rows than the interspace the primary set will come to enter the second section and the secondary set will come to enter the first section. In order that in such cases no set will be effective in both sections instead only in one, I enable the pushing ends of the pushing-needles of the respective set or sets to be brought and held in and out of effective direction as the case may require, by passing the pushing ends of the respective pushing-needles through slots, $P^1$ Figs. 3, 4, 5, 17 and 18, of the plate P and through holes of the before-mentioned slide-strips Q, $Q^1$, sliding on an adjusting-bar U towards which they are suitably held by springs V, Figs. 2 and 3. By means of such slide the pushing ends of the respective pushing needles can be held either in effective direction for the first section and dropped then, suitably half an interstice, out of effective direction, for the second section, or held out of effective direction, suitably half an interstice higher, for the first section and dropped then into effective direction for the second section. The dropping of the slide strip or slide strips is best effected in the middle of the interspace, instead suddenly after a slide has left the first section or before it is entering the second section. In the examples four vertical rows of needles C are omitted for the lacing-interspace W, as indicated on the top line of the grate $D^2$, consequently the second needle set X is arranged at a distance from the first set for the repeat equal to the distance of three vertical rows of needles C. In the starting position of the plate P, Fig. 3, the points of the pushing-needles of only the first slide-strip are held in exact acting-direction whereas those of the second slide are each held half an interstice higher than the first. In the middle of the interspace W, at position 4, Fig. 4, the second slide will be lowered so as to bring the points of its needles in direction ready for action when they arrive at the second section of the repeat. At position 8, Fig. 5, the first slide will also drop, to bring the points of its needles out of the exact acting-direction, that they remain so when entering and passing the second section of the repeat. The complete course and effect of the slides Q, $Q^1$ will be seen from Figs. 7 to 16 in relation to a card for five repeats of 80 jacquard needles each. No. III is the repeat bisected by the interspace W extending across 4 vertical rows. The interspace is marked by intermittent lines while the limits of the repeats are indicated by full lines. The dots are the diagrammatical projection of the points of the pushing-needles N into the card.

Figs. 7 to 16 show also the progressive reading-in of the fragmentary pattern-line Fig. 6. Crosses corresponding with those of Fig. 6 mark on the rows of dots those pushing-needles that are caused by striking the corresponding key-levers L to bring the respective needles C and thereby the punches in readiness for operation. The small circles signify the already selected needles C or punches. After the tenth position, Fig. 16, the card will be punched, that is to say the knives B and the punch-apparatus are caused to operate.

In the example Figs. 17 to 18, showing broken sets of pushing- and feeler-needles, only the first set for the repeat crossed by the interspace W requires a slide Q; the second set, needs none because this set is in the starting position already beyond the first section, Fig. 17. The slide Q will be lowered at position 6 and drop the points of its pushing-needles out of acting-direction in readiness for position 7, Fig. 18, at which position the pushing-needles 7 & 8 come opposite to the first row of slip needles C of the second section, which row had, however, already been controlled by the first set. The complete course and effect of the slide will be seen from Figs. 32 to 38 in relation to a card for 7 repeats of 50 jacquard-needles each and for 10 needles of an eighth, fragmentary, repeat.

Figs. 32 to 38 show also the progressive reading-in of the pattern-line Fig. 31, the signs used being the same as in Figs. 7 to 16.

Obviously some features of this invention may be used without others, and the invention may be embodied in widely varying forms, therefore, without limiting the invention to the construction shown and described, nor enumerating equivalents, I claim and desire to obtain by Letters Patent the following:

1. In combination, pushing-needles arranged by sets at predetermined distances apart, and controlled by feeler needles, a guide plate provided with holes through which the pushing ends of the pushing-needles of certain of said sets are passed, said guide plate being also provided with slots through which the ends of the pushing-needles of certain others of said sets are passed, a slide-strip disposed adjacent to said slots and carrying in holes the ends of the pushing-needles passing through said slots, an adjusting bar or bars enabling said slides to hold and bring the projecting ends of their pushing-needles into and out of acting- or not-acting direction as desired.

2. In a pattern-card-punching-machine, a selecting apparatus, consisting of a movable carriage, a plurality of sets of pushing-needles arranged in said carriage, a corresponding plurality of sets of feeler needles controlling the pushing needles, a pushing-grate arranged to act against the pushing-needles, slide-strips enabling certain of said pushing-needles to be brought and held into or out of effective position, bars arranged to act against said feeler needles, and keys controlling said bars.

3. In a pattern-card-punching-machine, a selecting apparatus consisting of a movable carriage, a plurality of sets of pushing needles disposed in the carriage, a corresponding plurality of sets of feeler needles controlling the pushing-needles, a pushing-grate arranged to act against the pushing-needles, slide-strips additionally controlling certain of the sets of pushing-needles, and key-governed bars arranged to act against said feeler needles.

4. A pattern-card-punching-machine comprising in combination, pushing-needles, a pushing-grate, feeler-needles, a guide plate and slide-strips for the pushing-needles, and an adjusting bar for said slide-strips, said pushing-needles being controlled by said feeler needles in relation to the pushing-grate, and by said slide-strips relatively to their normal positions in said guide plate.

5. In a pattern-card-punching-machine for punching simultaneously a number of repeats, a selecting apparatus comprising a carriage, a series of pushing needles for each repeat arranged in said carriage, an additional series of pushing needles arranged in said carriage for providing an interspace in a repeat, a guide plate for guiding said pushing needles and slide strips, one for each said series of pushing needles, each said slide strip adapted to move its corresponding pushing needles into or out of operative position.

6. In a pattern-card-punching-machine, a selecting apparatus comprising a carriage, pushing needles arranged in said carriage in a plurality of series, feeler needles arranged to control said pushing needles, pushing means arranged to operate said pushing needles, two slide strips, one for each of said series of pushing needles, each said strip arranged to move its corresponding pushing needles into or out of operative position and means for operating said feeler needles.

7. In a pattern-card-punching-machine for punching simultaneously a number of repeats, a selecting apparatus comprising a movable carriage, a series of pushing needles for each repeat arranged in said carriage, an additional series of pushing needles arranged in said carriage for providing an interspace in a repeat, means for moving one of said series of pushing needles into or out of operative position, and means for operating said feeler needles.

8. A pattern-card-punching-machine comprising in combination a plurality of sets of punch controlling means for punching different repeats, the punch controlling means corresponding to each repeat arranged in a plurality of rows, a carriage, sets of pushing needles for said sets of punch controlling means carried by said carriage and likewise arranged in rows, a plurality of selecting devices for said pushing needles each selecting device controlling corresponding pushing needles of the different sets, and means for operating selected needles to cause the operation of corresponding punch controlling means.

9. In a pattern-card-punching-machine for punching simultaneously a number of repeats, a selecting apparatus comprising a carriage, a series of pushing-needles for each repeat arranged in said carriage, an additional series of pushing needles arranged in said carriage for providing an interspace in a repeat, and means for moving said additional series of pushing needles into operative position and for moving the corresponding needles of the first mentioned series of needles out of operative position.

In testimony whereof I have signed this specification in the presence of two subscribing witnesses.

AUGUST MITTELSTEN SCHEID.

Witnesses:
 OTTO KÖNIG,
 LUDWIG BERGHAUS.